Dec. 21, 1926.　　　　　　　　　　　　　1,611,666
J. NACEY
VALVE
Filed Dec. 30, 1925
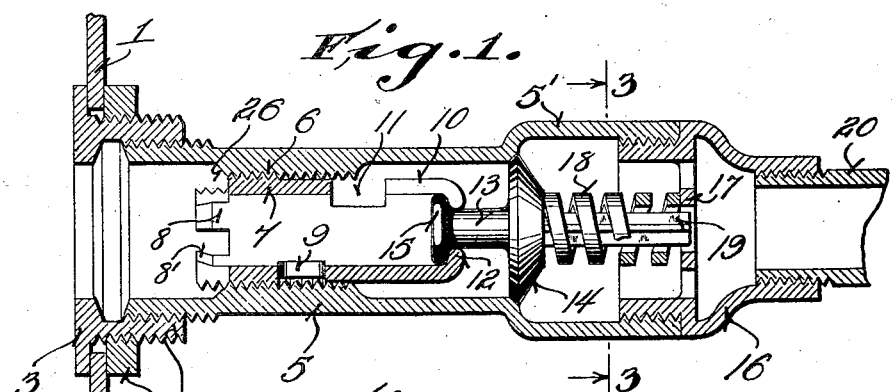
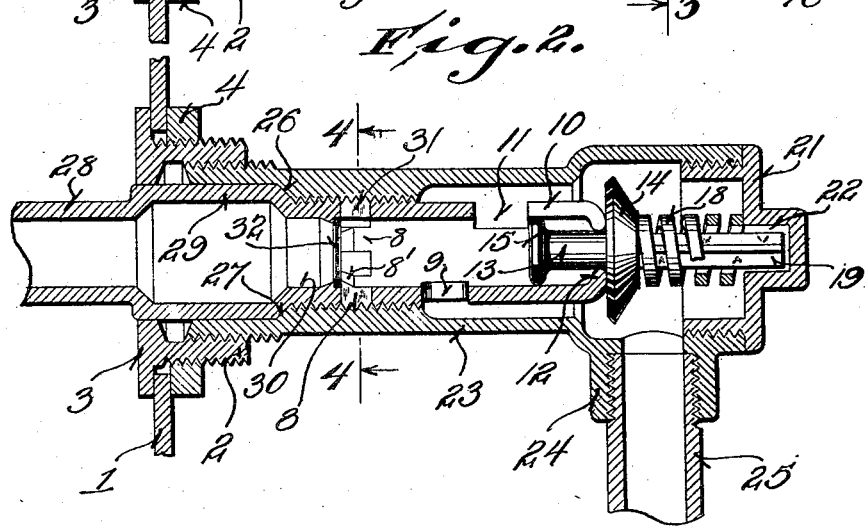
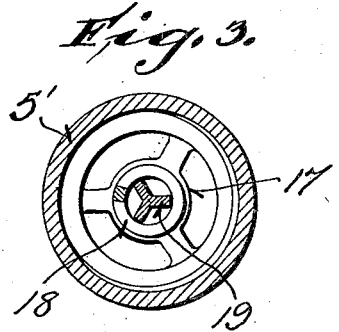 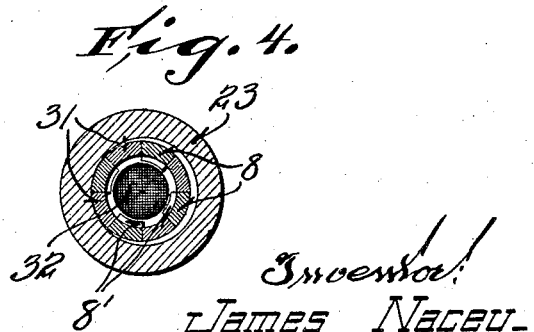
Inventor
James Nacey Patented Dec. 21, 1926.

1,611,666

UNITED STATES PATENT OFFICE.

JAMES NACEY, OF MILWAUKEE, WISCONSIN.

VALVE.

Application filed December 30, 1925. Serial No. 78,413.

This invention relates to valves.

In the usual construction for plumbing fixtures, it is customary to provide a shut-off valve in addition to the usual faucet so that when the faucet needs repairing, the shut-off valve may be closed to cut off the supply of water and allow the removal of the faucet. Obviously, this shut-off valve necessitates exposed piping and other objectionable features.

This invention is designed to overcome the above noted defects, and objects of such invention are to provide a novel form of valve which is used in connection with a faucet or other discharge device, so that when the faucet is removed, the valve automatically closes, and when the faucet is reinserted and screwed into place, the valve automatically opens.

The device is applicable to any type of plumbing, steam lines, radiator fittings as well as the usual water, air and oil systems, and further, it is applicable to the valve construction for steel barrels or tanks as will appear as the description proceeds.

Further objects are to provide a construction of valve which simplifies the maximum work normally found on faucets and which cooperate with the standard forms of plumbing fixtures. A further feature is to provide a construction which will filter and prevent splashing of the water discharged from the spigot.

Embodiments of the invention are shown in the accompanying drawings, in which:—

Figure 1 is a longitudinal sectional view through one form of the valve showing it in closed position, as it appears when the faucet is removed.

Figure 2 is a similar view through a second form of valve showing the faucet in position and the valve open.

Figure 3 is a sectional view on the line 3—3 of Figure 1.

Figure 4 is a sectional view on the line 4—4 of Figure 2.

In the form chosen for illustration, the device has been shown as applied to a sink or wash basin, and a portion of the back 1 of same has been shown. This back is provided with the usual aperture through which the internally and externally threaded portion 2 of a fitting projects. This fitting is in the nature of a nipple or bonnet forming a stuffing box and is provided with a hexagonal front head 3 to facilitate manipulation. A lock nut 4 is screwed upon the externally threaded portion and locks the fitting tightly against the back.

From this fitting a tubular member or body portion 5 extends rearwardly and has its forward end screwed into the internally threaded portion of the member 2. This body portion is provided with a threaded internal portion 6 within which a tubular cage or valve displacing member 7 is screwed. This valve displacing member is provided with a plurality of outwardly projecting tongues 8 which have square faces and project inwardly a slight distance, as indicated at 8'. Further, the cage 7 is provided with an opening 9 through which fluid may flow when the valve is displaced, as hereinafter described, and is further provided with a slot 10 and an enlarged opening 11 communicating with such slot to facilitate the assembly of the valve with reference to the cage, and also serve as ports for the fluid, as will appear hereinafter.

The outer end of the cage is provided with an inturned flange 12 which loosely grips the spindle 13 of the cut-off valve 14. The spindle is provided with an enlarged head 15 positioned within the cage.

The body portion 5 is provided with an enlarged tubular rear portion 5' which is internally threaded and receives the reduction connector 16, such connector being provided with a spider 17 against which one end of a spring 18 bears. This spring 18 surrounds the rearwardly projecting valve stem or guide 19 and bears at its forward end against the valve 14. The reduction connector receives the supply pipe 20, as shown in Figure 1.

In Figure 2 substantially the same construction has been shown except that the reduced connector 16 is replaced by a closure cap 21 with a hexagon head which is recessed, as indicated at 22 to receive the rearwardly projecting valve stem or guide 19.

Further, the body portion 23 of the valve is provided with a threaded right angle extension 24 which receives the supply pipe 25, otherwise the two constructions are the same.

In assembling the valve and cage, it is merely necessary to pass at a right angle, the enlarged head 15 of the forwardly extending valve stem 13 through the opening 11 and, thereafter, slide and rock the stem 13 through the slot 10 to thus position the parts, as shown in the drawings. This construction forms a satisfactory sliding connection and eliminates machine work on the parts. In each form of the invention, it is to be noted that an angular or slanting seat 26 is provided internally of the body portion of the device and this slanting seat is adapted to cooperate with the corresponding slanting seat 27 of the faucet. A fragment of the faucet is shown in Figure 2 from which it will be seen that the rearwardly extending tubular portion 28 is provided with an enlarged portion 29 which forms an enlarged chamber. It is provided with a reduced rearwardly extending threaded portion 30 which screws into the threaded portion 6 of the body of the valve.

Further, it is to be noted that the faucet is provided with tongues 31 which cooperate or interlock with the tongues 8 of the cage 7 and thus rotate the cage as the spigot is screwed into place. This backs the cage rearwardly and unseats the valve 14, as illustrated in Figure 2.

Further, it is to be noted that prior to the seating of the slanting portion 27 of the faucet against the slanted face 26 of the body portion, the threads of the spigot have engaged sufficiently with the threaded portion 6 of the valve to prevent leaking. The stuffing box is to be depended upon to prevent leakage at the grip on the thread against the blowing out of the spigot. However, when the spigot is screwed tightly into place, the face 27 seats against the face 26 and insures a fluid tight joint.

Obviously, when it is desired to remove or repair the faucet, it is merely necessary to unscrew it. During this operation, the cage 7 is screwed forward and allows the valve 14 to seat under the action of the spring 18. Further, the flange 12 pulls the valve into tightly seated position.

It is to be particularly noted from reference to Figure 2 that the rear end of the spigot is recessed and receives a gauze pad or disk 32. This disk is held in place by the inwardly projecting portions 8' of the tongues 8 of the cage 7, as shown most clearly in Figure 2. This screen disk filters, retards, and unifies the flow of the water, or in other words makes it more even throughout its cross-sectional area. Further, the water on entering the enlarged enclosure or chamber 29 also is brought more nearly to the same speed throughout its entire cross-sectional area, and is thus discharged from the faucet in a uniform stream to thereby avoid splashing.

While this invention has been described as applied to water pipes and cooperating with the usual wash basins or sinks, it is to be understood, as stated previously, that the valve may be used in a variety of capacities.

It will be seen that a novel form of fitting has been provided which is equipped with an automatic valve so that when a spigot or discharge member is screwed into place, the valve is automatically unseated and when the spigot is removed, the valve is automatically closed.

It is clear, therefore, that this construction dispenses with the ordinary shut-off valve and an exposed pipe commonly employed.

Although the invention has been described in considerable detail, such description is intended as illustrative rather than limiting as the invention may be variously embodied and as the scope of such invention is to be determined as claimed.

I claim:

1. A valve for the reception of a faucet provided with projecting portions, said valve comprising a body portion having an aperture therethrough, said aperture being internally threaded, a cage externally threaded and fitting the threads of said aperture, said cage having a plurality of forwardly extending tongues, a valve loosely interlocked with said cage and adapted to be unseated by said cage when said cage is screwed rearwardly, and a spring cooperating with said valve and tending to maintain said valve in a closed position.

2. A valve for the reception of a fitting provided with projecting portions, said valve comprising a body portion having an internally threaded aperture extending therethrough and having a valve seat, a valve cooperating with said seat and guided at its rear end, a spring urging said valve towards closed position, and means for guiding the forward end of said valve, said means loosely engaging said valve and being externally threaded and cooperating with the internally threaded body portion, said means having forwardly projecting portions adapted to be engaged by the projecting portions of the received fitting, whereby said valve is unseated when a fitting is screwed into place.

3. A valve for the reception of a fitting provided with projecting portions, comprising a body portion having an aperture therethrough provided at a portion of its extent with internal threads and at a spaced portion with a valve seat, a valve cooperating with said valve seat, a cage having an aperture therethrough and being externally threaded and cooperating with the internal threads of the body portion, said cage having a rearwardly extending portion loosely engaging said valve and having a forwardly extending portion provided with projections adapted to be engaged for the projections of the received fitting.

In testimony that I claim the foregoing I have hereunto set my hand at Milwaukee, in the county of Milwaukee, and State of Wisconsin.

JAMES NACEY.